United States Patent
Droscher et al.

(10) Patent No.: US 11,821,522 B2
(45) Date of Patent: Nov. 21, 2023

(54) MECHANICAL SEAL ARRANGEMENT SUITABLE FOR PRESSURE REVERSAL

(71) Applicant: EagleBurgmann Germany GmbH & Co. KG, Wolfratshausen (DE)

(72) Inventors: Peter Droscher, Geretsreid (DE); Robert Reischl, Bad Tölz (DE); Thomas Stemplinger, Gaißach (DE); Carsten Scholz, Eurasburg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 163 days.

(21) Appl. No.: 17/429,811

(22) PCT Filed: Dec. 17, 2019

(86) PCT No.: PCT/EP2019/085548
§ 371 (c)(1),
(2) Date: Aug. 10, 2021

(87) PCT Pub. No.: WO2020/169235
PCT Pub. Date: Aug. 27, 2020

(65) Prior Publication Data
US 2022/0128152 A1    Apr. 28, 2022

(30) Foreign Application Priority Data
Feb. 18, 2019 (DE) ................ 10 2019 202 109.3

(51) Int. Cl.
*F16J 15/34* (2006.01)
*F16J 15/38* (2006.01)

(52) U.S. Cl.
CPC ....... *F16J 15/3436* (2013.01); *F16J 15/3464* (2013.01); *F16J 15/38* (2013.01); *F16J 15/3452* (2013.01)

(58) Field of Classification Search
CPC .. F16J 15/3436; F16J 15/3452; F16J 15/3464; F16J 15/38
See application file for complete search history.

(56) References Cited

U.S. PATENT DOCUMENTS 4,124,218 A * 11/1978 Wentworth, Jr. ...... F16J 15/022
                                                    29/888.3
4,434,986 A *  3/1984 Warner ................ F16J 15/3464
                                                      277/374
(Continued)

FOREIGN PATENT DOCUMENTS

DE         3012711 A1    10/1980
DE     102012022465 A1     5/2014
(Continued)

OTHER PUBLICATIONS

International Search Report issued in PCT/EP2019/085548, dated Mar. 26, 2020.

*Primary Examiner* — Nicholas L Foster
(74) *Attorney, Agent, or Firm* — Locke Lord LLP; Scott D. Wofsy

(57) ABSTRACT

The invention relates to a mechanical seal assembly comprising a mechanical seal (2) with a rotating slide ring (3) and a stationary slide ring (4) defining a seal gap (5) therebetween, a pretensioning device (6) which biases the stationary slide ring (4) in the axial direction (X-X) of the slide ring seal arrangement, a support ring (7) which is arranged on the stationary slide ring (4), the support ring (7) being axially movable relative to the stationary slide ring (4) the pretensioning device (6) being arranged between the support ring (7) and the stationary slide ring, a fixing device (8) which is arranged for axially movable fixing the support ring (7) to a stationary component, a stop (9) which limits a distance (W1) by which the axially movable support ring (7) can be moved, and a secondary seal (10) which is arranged (Continued)

Figure 1:
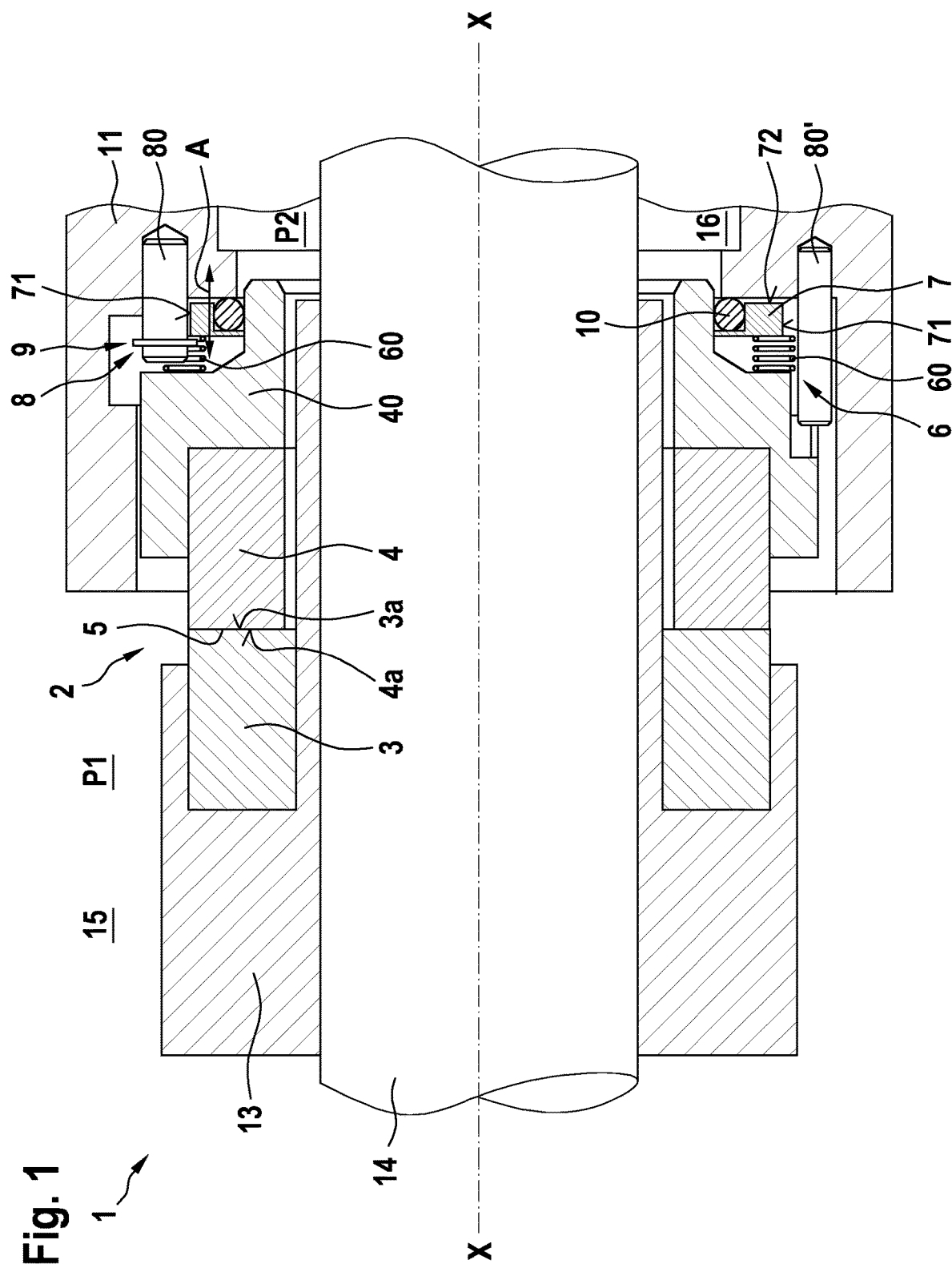

to seal between the support ring (7) and the stationary component.

7 Claims, 3 Drawing Sheets

(56) References Cited

U.S. PATENT DOCUMENTS

| | | | | |
|---|---|---|---|---|
| 4,586,719 | A * | 5/1986 | Marsi | F04D 29/126 |
| | | | | 277/398 |
| 5,556,110 | A * | 9/1996 | Marsi | F16J 15/3464 |
| | | | | 277/397 |
| 6,076,830 | A | 6/2000 | Wu et al. | |
| 6,293,555 | B1 | 9/2001 | Sedy | |
| 6,494,460 | B2 * | 12/2002 | Uth | F16J 15/342 |
| | | | | 277/400 |
| 7,862,046 | B2 * | 1/2011 | Lederer | F16J 15/342 |
| | | | | 277/390 |
| 8,191,899 | B2 * | 6/2012 | Droscher | F16J 15/3464 |
| | | | | 277/358 |
| 8,783,691 | B2 * | 7/2014 | Suefuji | F16J 15/16 |
| | | | | 277/408 |
| 9,334,965 | B2 * | 5/2016 | Kim | F16J 15/3464 |
| 9,447,885 | B2 * | 9/2016 | Suefuji | F16J 15/3464 |
| 10,234,036 | B2 * | 3/2019 | Lewis | F01D 11/003 |
| 10,955,054 | B2 * | 3/2021 | Droscher | F16J 15/006 |
| 11,028,927 | B2 * | 6/2021 | Lewis | F16J 15/3448 |
| 11,371,500 | B2 * | 6/2022 | Sato | F04B 53/00 |
| 11,448,322 | B2 * | 9/2022 | Droscher | F16J 15/3464 |
| 11,506,217 | B2 * | 11/2022 | Sihra | F16J 15/40 |
| 2002/0060431 | A1 * | 5/2002 | Takahashi | F16J 15/38 |
| | | | | 277/372 |
| 2009/0134584 | A1 * | 5/2009 | Lederer | F16J 15/3464 |
| | | | | 277/369 |
| 2009/0152818 | A1 * | 6/2009 | Droscher | F16J 15/3464 |
| | | | | 277/370 |
| 2012/0187636 | A1 * | 7/2012 | Suefuji | F16J 15/34 |
| | | | | 277/387 |
| 2014/0145404 | A1 * | 5/2014 | Kim | F16J 15/38 |
| | | | | 277/379 |
| 2015/0159759 | A1 * | 6/2015 | Suefuji | F16J 15/3484 |
| | | | | 277/369 |
| 2017/0299062 | A1 * | 10/2017 | Blais | F16J 15/342 |
| 2018/0023559 | A1 * | 1/2018 | Sato | F04B 53/00 |
| | | | | 277/359 |
| 2019/0219169 | A1 * | 7/2019 | Droscher | E21B 43/128 |
| 2021/0231219 | A1 * | 7/2021 | Droscher | F16J 15/3464 |

FOREIGN PATENT DOCUMENTS

| | | |
|---|---|---|
| EP | 2063155 A1 | 5/2009 |
| WO | 2011/095195 A1 | 8/2011 |
| WO | 2017/211491 A1 | 12/2017 |

* cited by examiner

MECHANICAL SEAL ARRANGEMENT SUITABLE FOR PRESSURE REVERSAL

CROSS-REFERENCE TO RELATED APPLICATIONS

This application is a U.S. National Phase Application filed under 35 U.S.C. § 371, based on International Patent Application No. PCT/EP2019/085548, filed Dec. 17, 2019, which claims priority to German Patent Application No. 10 2019 202 109.3, filed on Feb. 18, 2019, the entire contents of which is incorporated herein by reference.

The present invention relates to a mechanical seal arrangement that is suitable for providing appropriate sealing even when reversing pressure.

Mechanical seals are known from prior art in various configurations. During operation, situations may occur where pressure conditions at the mechanical seal arrangement are reversed, for example due to incorrect operation or failure of or damage to components. In such a situation, the mechanical seal arrangement is required to ensure minimal or no leakage even in the event of pressure reversal, since otherwise corresponding damage or environmental pollution could occur, for example when sealing toxic media or media that are harmful to humans and the environment. For this purpose, mechanical seal arrangements with improved secondary sealing elements are used, for example, as known from DE10 2012 022 465 A1. However, they are usually very expensive secondary sealing elements, which make the mechanical seal arrangement correspondingly more expensive in terms of cost.

Therefore, it is the object of the present invention to provide a mechanical seal arrangement which, with a simple and inexpensive design, withstands especially a pressure reversal and, if possible, prevents leakage at the mechanical seal during pressure reversal.

This object will be solved by a mechanical seal arrangement having the features of claim 1. The subclaims show preferred further developments of the invention.

The mechanical seal arrangement according to the invention ensures reliable sealing to be possible even when reversing pressure conditions at the mechanical seal arrangement. It is possible to use standard components, so that the mechanical seal arrangement can be provided at particularly low cost. For this purpose, the mechanical seal arrangement comprises a mechanical seal including a rotating slide ring and a stationary slide ring, which define a sealing gap between their sealing surfaces. Furthermore, a pretensioning device is provided which is used to pretension the stationary slide ring against the rotating slide ring in the axial direction of the mechanical seal arrangement. Furthermore, the mechanical seal arrangement comprises a support ring which is arranged on the stationary slide ring and which is movable in the axial direction in relation to the stationary slide ring, the pretensioning device being arranged between the axially movable support ring and the stationary slide ring. Furthermore, a fixing device is provided, which is arranged to fix the support ring in axial direction to a stationary component to be axially movable. Furthermore, a stop is provided which limits a first travel distance by which the axially movable support ring can axially be moved, as well as a secondary seal, which is configured for sealing between the support ring and the stationary component. When pressure reversal occurs, the support ring is subjected to a higher pressure from the other axial side than during regular operation, so that the support ring will be moved towards the stationary slide ring. This increases a spring force of the pretensioning device on the stationary slide ring so that consistent sealing is ensured at the sealing gap between the rotating and stationary slide rings.

Preferably, the fixing device comprises a plurality of bolts, and the support ring comprises a plurality of recesses through which the bolts are passed. Simple and safe axial movability of the support ring may thereby be achieved. Preferably, the recesses are provided on the outer circumference of the support ring. Particularly preferably, the recesses are provided as semicircles or as semi-ovals.

A particularly easy structure results if the stop comprises at least one retaining ring, which is arranged on at least one of the bolts to limit axial travel of the support ring. The retaining ring may be fixed to the bolt or alternatively a shoulder may be provided on the bolt instead of the retaining ring.

According to an alternative embodiment of the invention, the fixing device comprises a plurality of headed bolts, the stop being provided by the head of the bolts.

Particularly preferably, the bolts are equally spaced along the circumference of the support ring.

Further preferably, the support ring has a groove for receiving the secondary seal. This allows realization of a particularly solid structure. The groove in the support ring also ensures the smallest possible axial overall length of the mechanical seal arrangement. The groove is provided on a side of the support ring facing away from the stationary slide ring. Particularly preferably, the groove is arranged on a radial inner circumference of the support ring.

Alternatively, the support ring is groove-free and the secondary seal is arranged on a stationary component. In this case, it is particularly preferably to provide a groove for the secondary seal in the stationary component, where the secondary seal is arranged. The secondary seal then seals against the groove-free side of the support ring.

Particularly preferably, the secondary seal is an O-ring or a quad ring. This means that the secondary seal can be provided with particular ease and at low cost.

Preferably, a second axial path is provided between the stationary component and the axially movable support ring. Herein, the first axial travel distance between the support ring and the stop is smaller than the second axial travel distance between the support ring and the stationary component when pressure reversal occurs. This means that reliable sealing of the secondary seal may always be ensured.

Further preferably, the pretensioning device comprises a plurality of springs, which are especially cylindrical springs. Particularly preferably, the springs are arranged at equal intervals along the circumference and are supported on the support ring. Alternatively, only one single spring element is provided.

Further preferably, the mechanical seal arrangement further comprises a stationary slide ring carrier holding the stationary slide ring, wherein the pretensioning device is arranged between the stationary slide ring carrier and the support ring. As a result, the pretensioning device is not in direct contact with the stationary slide ring, so that especially a material of the stationary slide ring may freely be selected.

Figure 2:
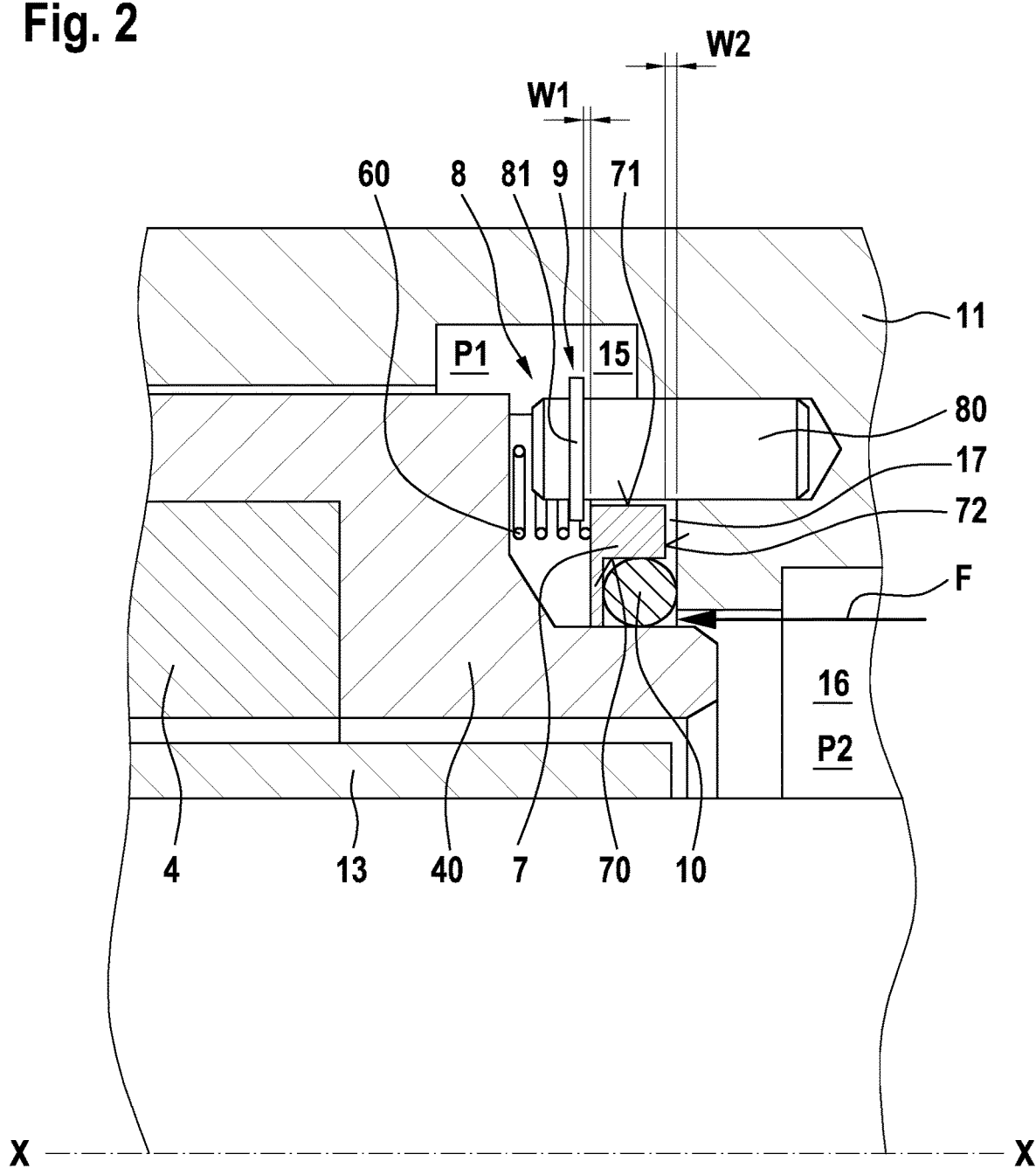
Figure 3:
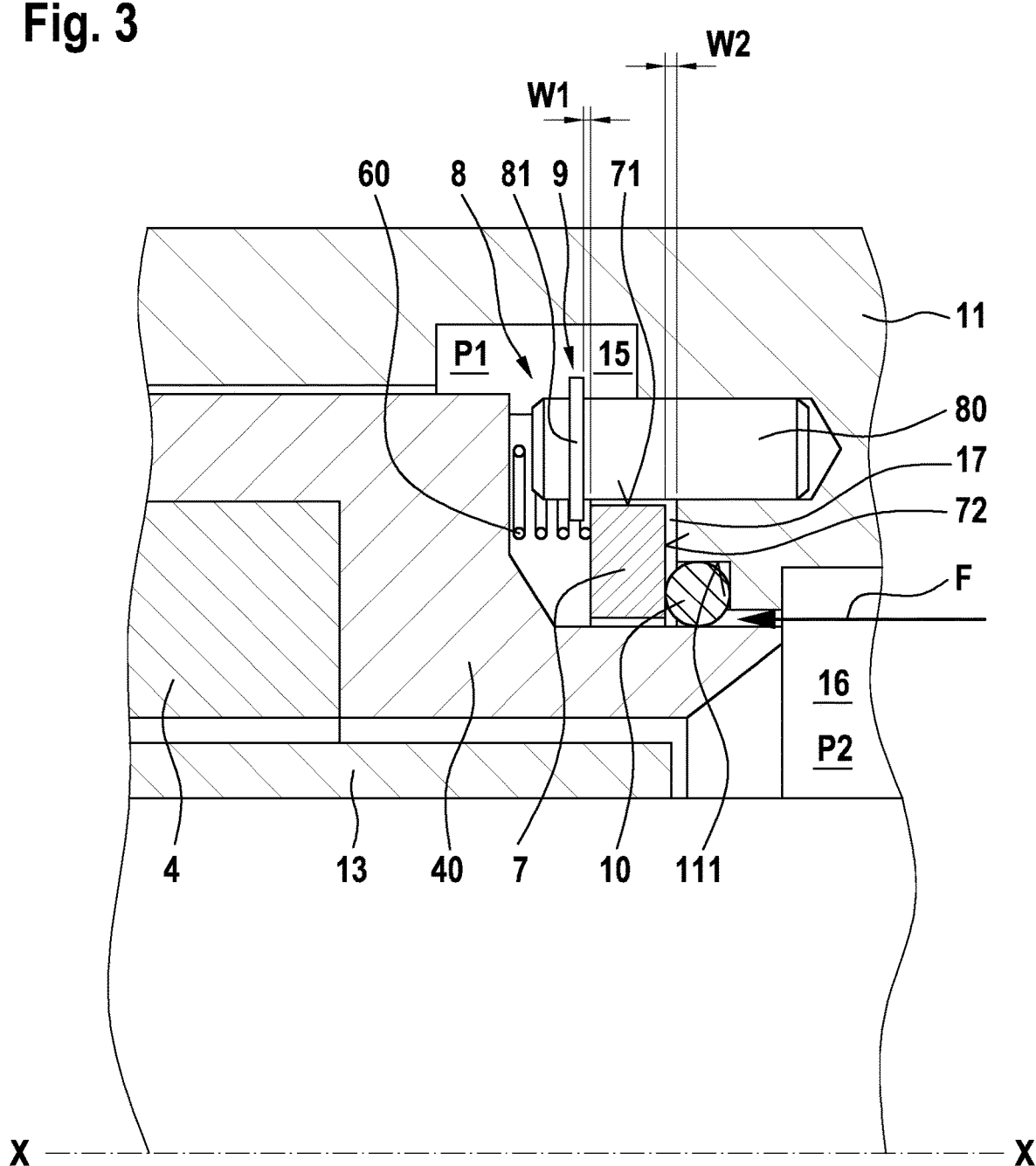

In the following, preferred embodiments of the invention will be described in detail while reference will be made to the accompanying drawing, wherein:

FIG. 1 is a schematic longitudinal sectional view of a mechanical seal arrangement according to a first embodiment of the invention, FIG. 2 is a schematic, enlarged partial sectional view of the mechanical seal arrangement of FIG. 1, and FIG. 3 is a schematic, enlarged partial sectional view of a mechanical seal arrangement according to a second embodiment of the invention.

In the following, a mechanical seal arrangement 1 according to a first preferred embodiment of the invention will be described in detail, while making reference to FIGS. 1 and 2.

As can be seen from FIG. 1, the mechanical seal arrangement 1 comprises a mechanical seal 2 with a rotating slide ring 3 and a stationary slide ring 4. A sealing gap 5 is defined between the sliding surfaces 3a, 4a of the slide rings 3, 4.

The mechanical seal arrangement seals a first space 15 against a second space 16 on a shaft 14. A sleeve 13 is fixed to the shaft 14, which also holds the rotating slide ring 3. The stationary slide ring 4 is axially movably connected to a stationary component 11 via a stationary slide ring carrier 40.

The mechanical seal arrangement 1 further comprises a pretensioning device 6. The pretensioning device 6 comprises a plurality of cylindrical springs 60, which are arranged at equal intervals along the circumference.

Furthermore, the mechanical seal arrangement 1 comprises a support ring 7. The support ring 7 is arranged on the stationary slide ring 4 and is held to be axially movable, which is indicated by the double arrow A. The support ring 7 is arranged on the stationary slide ring 4. That is, the support ring 7 is movable in both directions of the axial direction X-X of the mechanical seal arrangement 1.

The pretensioning device 6 including the plurality of cylindrical springs 60 is thereby arranged between the support ring 7 and the stationary mechanical seal carrier 40.

Furthermore, a fixing device 8 is provided, which is configured to fix the support ring 7 to the stationary component 11 to be axially movable in relation to the stationary slide ring 4. As can be seen from FIG. 1, the fixing device 8 comprises a plurality of bolts 80 and 80'. The bolts 80' fix the stationary mechanical seal carrier 40 to the stationary component 11. The bolts 80 hold the support ring 7 axially movably on the stationary component 11. The bolts 80, 80' are each arranged in recesses 71 on the outer circumference of the support ring 7.

Furthermore, the mechanical seal arrangement 1 comprises a stop 9. The stop 9 serves to limit the axially travelable distance of the support ring 7. In this example embodiment, the stop 9 is provided on the fixing device 8. As can especially be seen from FIG. 2, herein, a retaining ring 81 is arranged on the bolt 80, which projects over the cylindrical outer circumference of the bolt 80. The bolt contacts the retaining ring 81 during axial movement of the support ring 7 towards the stationary slide ring carrier 40 thus limiting a first axial travel distance W1 towards the stationary slide ring 4. A second axial travel distance W2 towards the stationary component 11 is limited by the stationary component 11 itself.

FIG. 2 shows the two travel distances W1, W2 in the regular operating state of the mechanical seal arrangement 1, wherein the travel distances are preferably equal.

Furthermore, the mechanical seal arrangement 1 comprises a secondary seal 10 in the form of an O-ring. As can be seen from FIG. 2, the secondary seal 10 is arranged in a groove 70 in the support ring 7. The groove 70 is formed on a side 72 facing away from the stationary slide ring. By arranging the secondary seal 10 on the side facing away from the stationary slide ring 4, the axial movability of the support ring 7, especially towards the stationary slide ring 4, is not impaired. As can be seen from FIG. 2, which shows the state referred to as the regular operating state, where a first pressure P1 in the first chamber 15 is greater than a second pressure P2 in the second chamber 16, the secondary seal 10 seals against the stationary seal ring carrier 40, on the support ring 7 and on the stationary component 11. Thus, no fluid can enter the first chamber 15 from the second chamber 16 through the secondary seal 10. Since the first pressure P1 is also present at the rear side of the stationary mechanical seal carrier 40, sealing at the sealing gap 5 may reliably be realized using the pretensioning device 6.

In the event of a pressure reversal, when the second pressure P2 becomes greater than the first pressure P1, a pressure force F, starting from the second chamber 16, is exerted on the secondary seal 10. This is shown in FIG. 2 by the arrow F. As soon as the pressure force F becomes greater than the restoring force of the cylinder springs 60, the support ring 7 moves toward the stationary slide ring 4. This axial movement is limited by the retaining ring 81. This ensures that the secondary seal 10 is still attached to the stationary sealing surface 40, on the support ring 7 and on the stationary component 11, since a gap 17 between the support ring 7 and the stationary component 11 does not become too large. Furthermore, sufficient closing force can also be applied to the sealing gap 5 at the sealing surfaces 3a, 4a of the slide rings 3, 4, so that the slide ring seal 2 also keeps sealing against the sealing surfaces 3a, 4a when the pressure is reversed. This ensures only minimum amount of fluid to pass from the second chamber 16 into the first chamber 15 during pressure reversal.

FIG. 3 shows a section of a mechanical seal arrangement according to a second example embodiment of the invention. The second embodiment is substantially the same as the first embodiment, with operationally equal parts being designated as in the first embodiment.

As can be seen from FIG. 3, the support ring 7 is groove-free, in the second example embodiment. Herein, the secondary seal 10 is arranged in a groove 111 in the stationary component 11. The secondary seal seals against the side 72 of the support ring 7. In this way, the support ring 7 can particularly easily be manufactured. When the pressure conditions at the mechanical seal arrangement 1 are reversed, a compressive force F is applied to the secondary seal 10, as in the first embodiment. This allows the support ring 7 to move in the axial direction X-X as far as the stop 9 on the retaining ring 81. In this case, however, the secondary seal 10 remains in sealing contact with the stationary mechanical seal carrier 40, the support ring 7 and the stationary component 11. In this way, it is also possible to prevent large quantities of medium from passing from the second chamber 16 into the first chamber 15 when pressure reversal occurs at the mechanical seal. At the same time, the mechanical seal 2 also remains in the closed position.

As described in the example embodiments, a mechanical seal arrangement 1 may thus be provided in accordance with the invention, which enables reliable sealing especially when pressure reversal of the pressure conditions at the mechanical seal 2 occurs. As a result, contamination of the medium in chamber 15 by media from chamber 16, for example bearing oil, can be minimized.

LIST OF REFERENCE NUMBERS

1 Mechanical seal arrangement
2 Mechanical seal
3 rotating slide ring
3a sliding surface 4 stationary slide ring
4a sealing surface
5 sealing gap
6 pretensioning device
7 support ring
8 fixing device
9 stop
10 secondary seal
11 stationary component
13 sleeve
14 shaft
15 first space
16 second space
17 gap
40 stationary mechanical seal
60 cylindrical spring
70 groove
71 recess for fixing device
72 side on support ring facing away from stationary slide ring
80, 80' bolt
81 retaining ring
111 groove
A axial movement of the support ring
F pressure force at pressure reversal
P1 first pressure
P2 second pressure
W1 first travel distance of the support ring in axial direction to the stationary slide ring
W2 second travel distance of the support ring in axial direction to the stationary component
X-X axial direction

The invention claimed is:

1. A mechanical seal arrangement comprising:
a mechanical seal with a rotating slide ring and a stationary slide ring having a sealing gap defined therebetween,
a pretensioning device which pretensions the stationary slide ring in an axial direction of the mechanical seal assembly,
a support ring which is arranged on the stationary slide ring, the support ring being axially movable in relation to the stationary slide ring,
the pretensioning device being arranged between the support ring and the stationary slide ring,
a fixing device which is arranged for axially movable fixing of the support ring to a stationary component,
a stop which limits a first travel distance by which the axially movable support ring can be moved, and
a secondary seal, which is arranged to seal between the support ring and the stationary component,
wherein the first travel distance between the support ring and the stop is smaller than a second travel distance between the support ring and the stationary component,
wherein the fixing device includes a plurality of bolts and the support ring includes a plurality of recesses through which said bolts are passed and wherein the plurality of recesses are arranged on an outer circumference of the support ring.

2. The mechanical seal arrangement according to claim 1, wherein the stop comprises a retaining ring arranged on a bolt to limit the first travel distance of the axially movable support ring.

3. The mechanical seal arrangement according to claim 1, wherein the fixing device comprises a plurality of headed bolts, the stop being provided by the head of the bolts.

4. The mechanical seal arrangement according to claim 1, wherein the support ring has a groove on a side facing away from the stationary slide ring for receiving the secondary seal.

5. The mechanical seal arrangement according to claim 4, wherein the groove is arranged on a radial inner circumference of the support ring.

6. The mechanical seal arrangement according to claim 1, wherein the support ring does not have a groove for receiving the secondary seal, and the secondary seal bears against a side of the support ring, facing away from the stationary slide ring.

7. The mechanical face seal assembly according to claim 1, further comprising a stationary slide ring carrier holding the stationary slide ring, wherein the pretensioning device is arranged between the stationary slide ring carrier and the support ring.

* * * * *